US010664660B2

(12) United States Patent
Li et al.

(10) Patent No.: US 10,664,660 B2
(45) Date of Patent: May 26, 2020

(54) METHOD AND DEVICE FOR EXTRACTING ENTITY RELATION BASED ON DEEP LEARNING, AND SERVER

(71) Applicant: Beijing Baidu Netcom Science and Technology Co., Ltd., Beijing (CN)

(72) Inventors: Shuangjie Li, Beijing (CN); Yabing Shi, Beijing (CN); Haijin Liang, Beijing (CN); Yang Zhang, Beijing (CN); Jingfeng Li, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/128,410

(22) Filed: Sep. 11, 2018

(65) Prior Publication Data
US 2019/0155898 A1    May 23, 2019

(30) Foreign Application Priority Data

Nov. 23, 2017    (CN) .......................... 2017 1 1178693

(51) Int. Cl.
*G06F 17/27* (2006.01)
*G06F 40/295* (2020.01)
*G06N 3/08* (2006.01)
*G06F 40/211* (2020.01)
*G06F 40/216* (2020.01)
*G06F 40/284* (2020.01)

(52) U.S. Cl.
CPC .......... *G06F 40/295* (2020.01); *G06F 40/211* (2020.01); *G06F 40/216* (2020.01); *G06F 40/284* (2020.01); *G06N 3/08* (2013.01)

(58) Field of Classification Search
None
See application file for complete search history.

(56) References Cited

U.S. PATENT DOCUMENTS

| 9,110,852 B1* | 8/2015 | Lerman | G06F 17/15 |
| 9,418,128 B2* | 8/2016 | Li | G06F 16/258 |
| 10,019,516 B2* | 7/2018 | Zhang | G06F 16/367 |
| 10,108,907 B2* | 10/2018 | Bugay | G06F 16/338 |

(Continued)

FOREIGN PATENT DOCUMENTS

| CN | 103365912 A | 10/2013 |
| CN | 104199972 A | 12/2014 |

(Continued)

OTHER PUBLICATIONS

First Chinese Office Action dated Sep. 3, 2019, received for corresponding Chinese Application No. 201711178693.3, 10 pages.

(Continued)

*Primary Examiner* — Satwant K Singh
(74) *Attorney, Agent, or Firm* — Kinney & Lange, P.A.

(57) ABSTRACT

A method and device for extracting entity relation based on deep learning and a server are provided. The method includes: preprocessing a text to be mined, to obtain a sentence with entities in the text to be mined; determining an entity pair in the sentence according to the entities, wherein the entity pair includes at least two entities, and determining candidate relations between entities in the entity pair; and determining an entity relation between the entities in the entity pair from the candidate relations.

15 Claims, 4 Drawing Sheets

(56) References Cited

U.S. PATENT DOCUMENTS

| | | | |
|---|---|---|---|
| 10,198,431 B2* | 2/2019 | Somasundaran | G06F 40/295 |
| 10,303,999 B2* | 5/2019 | Hertz | G06Q 10/10 |
| 10,372,763 B2* | 8/2019 | Joshi | G06F 16/93 |
| 2016/0267409 A1* | 9/2016 | Vatnani | G06Q 10/0637 |
| 2017/0213157 A1* | 7/2017 | Bugay | G06F 17/2785 |
| 2019/0034835 A1* | 1/2019 | Bugay | G06F 16/338 |

FOREIGN PATENT DOCUMENTS

| | | |
|---|---|---|
| CN | 105138507 A | 12/2015 |
| CN | 105468583 A | 4/2016 |
| CN | 105938495 A | 9/2016 |
| CN | 106484675 A | 3/2017 |
| CN | 106777275 A | 5/2017 |
| CN | 107220237 A | 9/2017 |
| CN | 107291687 A | 10/2017 |

OTHER PUBLICATIONS

International Search Report dated Nov. 23, 2017, received for corresponding Chinese Application No. 201711178693.3, 5 pages.
International Search Report dated Aug. 27, 2019 received for corresponding Chinese Application No. 201711178693.3, 5 pages.

* cited by examiner

METHOD AND DEVICE FOR EXTRACTING ENTITY RELATION BASED ON DEEP LEARNING, AND SERVER

CROSS-REFERENCE TO RELATED APPLICATION

This application claims priority to Chinese Patent Application No. 201711178693.3, filed on Nov. 23, 2017, which is hereby incorporated by reference in its entirety.

TECHNICAL FIELD

The present disclosure relates to the technical field of data processing and data mining, and in particular, to a method and device for extracting entity relation based on deep learning, and a server.

BACKGROUND

With the development of information technology, quantity of information, such as information about news, blogs, and Weibo, is massive and had increasingly grown. The information contains many entities (entity pairs) and entity relation patterns between the entities. If the entities and entity relation patterns therebetween can be extracted from the information, information search, knowledge mining and scientific hypothesis generation or the like can be performed more effectively by using the extracted entities and the extracted entity relation patterns therebetween.

Two methods are commonly used for entity relation mining: one is mining based on a relation defined by a schema, that is, based on a limited given relation and relation-related entity classification, each relation is modeled separately to mine the related entity and relation data, e.g., characters and the parent-child relation between characters. The other is to define a subject in the entities and relation and mine an object in the entities, that is, the subject is mined from related corpus provided by a search engine on the basis of the object and relation searched by a user, for example, the given object and relation are Andy LIU and wife, and then the mining result should be Liqian ZHU.

However, it is difficult for the above two methods to comprehensively and accurately extract the entities and the entity-relation patterns therebetween from massive unstructured information.

SUMMARY

According to embodiments of the present disclosure, there is provided a method and device for extracting entity relation based on deep learning, and a server, with the purpose of at least solving the above technical problems in the prior art.

In a first aspect, a method for extracting entity relation based on deep learning is provided according to an embodiment of the present disclosure, the method includes:

preprocessing a text to be mined, to obtain a sentence with entities in the text to be mined;

determining an entity pair in the sentence according to the entities, wherein the entity pair includes at least two entities, and determining candidate relations between entities in the entity pair; and determining an entity relation between the entities in the entity pair from the candidate relations.

In conjunction with the first aspect, in the first embodiment of the first aspect of the present disclosure, preprocessing a text to be mined includes:

punctuating the text to be mined; and performing lexical analysis and syntactic analysis on a sentence obtained by punctuating and identifying entities in the sentence obtained by punctuating, to obtain the sentence with the entities.

In conjunction with the first aspect, in a second embodiment of the first aspect of the present disclosure, determining an entity pair in the sentence includes:

determining all candidate entity pairs in the sentence; and screening the candidate entity pairs according to a filtering condition, to obtain the entity pair in the sentence.

In conjunction with the second embodiment of the first aspect, determining all candidate entity pairs in the sentence includes:

identifying all entities contained in the sentence;

forming the candidate entity pairs by selecting any two entities of all entities.

In conjunction with the second embodiment of the first aspect, the filtering condition is determined according to at least one of:

a distance between the entities of the entity pair in a dependency tree, the entities of the entity pair being core words of noun phrases in the sentence, and part of speech of the entities of the entity pair.

In conjunction with the first aspect, in a third embodiment of the first aspect of the present disclosure, determining candidate relations between entities in the entity pair includes:

extracting the candidate relations between the entities of the entity pair in the sentence according an extracting strategy.

In conjunction with the third embodiment of the third aspect, the extracting strategy includes:

extracting all nouns and verbs under the entity pair in a relation tree.

In conjunction with the first aspect, in a fourth embodiment of the first aspect of the present disclosure, determining an entity relation between the entities in the entity pair from the candidate relations includes:

applying the entity pair and the candidate relations of the entity pair to an entity relation determining model, to obtain output results corresponding to the respective candidate relations; and in a case that the output result of the entity relation determining model is a positive example, calculating a confidence level of the candidate relation, and determining the entity relation of the entity pair according to the confidence level.

In a second aspect, a device for extracting entity relation based on deep learning is provided according to an embodiment of the present disclosure, the device includes:

a preprocessing module, configured for preprocessing a text to be mined, to obtain a sentence with entities in the text to be mined;

a determining module, configured for determining an entity pair in the sentence according to the entities, wherein the entity pair includes at least two entities, and determining candidate relations between entities in the entity pair; and a processing module, configured for determining an entity relation between the entities in the entity pair from the candidate relations.

In conjunction with the second aspect, in a first embodiment of the second aspect of the present disclosure, the preprocessing module includes:

a punctuating unit, configured for punctuating the text to be mined; and an analyzing unit, configured for performing lexical analysis and syntactic analysis on a sentence obtained by punctuating and identifying entities in the sentence obtained by punctuating, to obtain the sentence with the entities.

In conjunction with the second aspect, in a second embodiment of the second aspect of the present disclosure, the determining module includes:

a determining unit, configured for determining all candidate entity pairs in the sentence; and a screening unit, configured for screening the candidate entity pairs according to a filtering condition, to obtain the entity pair in the sentence.

In conjunction with the second aspect, in a third embodiment of the second aspect of the present disclosure, the determining module further includes:

an extracting unit, configured for extracting the candidate relations between the entities of the entity pair in the sentence according an extracting strategy.

In conjunction with the second aspect, in a fourth embodiment of the second aspect of the present disclosure, the processing module includes:

an obtaining unit, configured for applying the entity pair and the candidate relations of the entity pair to an entity relation determining model, to obtain output results corresponding to the respective candidate relations; and a calculating unit, configured for, in a case that the output result of the entity relation determining model is a positive example, calculating a confidence level of the candidate relation, and determining the entity relation of the entity pair according to the confidence level.

In a third aspect, a server is further provided according to the present disclosure, the server includes:

one or more processors; and a storage device for storing one or more programs;

wherein the one or more processors executes the one or more programs to implement the method as described above.

In a fourth aspect, a computer-readable storage medium in which a computer program is stored is further provided according to the present disclosure, wherein the program, when executed by a processor, implements the method as described above.

The functions can be realized by hardware as well as by hardware executing corresponding software. The hardware or software includes one or more modules corresponding to the above functions.

One of the above technical solutions has the following advantages or advantageous effects: preprocessing a text to be mined, obtaining a sentence containing entities and relations in the text to be mined; then extracting an entity pair and candidate relations existing therein; and further determining a candidate relation corresponding to the entity pair, whereby the relation is no longer limited in terms of category and field, and all words of any part of speech that can represent the relation between the entities are used as mining targets, whereby relation between the entities can be described better, and entities are no longer limited within a certain field, but extend to full-scale entities and concepts, which can effectively improve connectivity of knowledge schemas.

Another one of the above technical solutions has the following advantages or advantageous effects: using a deep learning model for unified modeling of all entity relations with no need for deep understanding of knowledge in the field or designing complex advanced features, making maintenance and expansion easy.

A further one of the above technical solutions has the following advantages or advantageous effects: extraction from massive internet texts can obtain grand-scale entity relation data, which can not only satisfy the needs of search and recommendation of popular entities, but also can better solve the problem of covering long-tail entities.

The above summary is provided only for illustration, and is not intended to limit the disclosure in any way. In addition to the illustrative aspects, embodiments and features described above, further aspects, embodiments and features of the present disclosure may be readily understood from the following detailed description with reference to the accompanying drawings.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

DETAILED DESCRIPTION

Hereinafter, only some exemplary embodiments are simply described. As can be recognized by those skilled in the art, the described embodiments may be modified in various different ways without departing from the spirit or scope of the present disclosure. Accordingly, the drawings and the description should be considered as illustrative in nature instead of being restrictive.

Entity relation data refers to a relation (pair, indicated by the letter P) between entities, and the entities include a subject (indicated by the letter S) and an object (indicated by the letter O). Therefore, an S-O pair and a relation are also referred to as SPO triple data. An open entity relation extraction system based on deep leaning according to embodiments of the present disclosure is intended to mine high-confidence entity relation data from massive internet texts through information extraction technology.

In the field of knowledge schema, entity relation is a key composite part of a knowledge schema. From the perspective of construction of knowledge schema, entity relation mining can enrich the relation knowledge in the schema and construct an association relation between entities. From the perspective of product application, on one hand, the entity relation can directly meet a user's search requirements for knowledge, for example, an answer can be directly provided by entity relation data when searching for "Liu XX, wife"; on the other hand, associated knowledge can be recommended to the user on the basis of the entity relation so that the user can be provided with a reading experience of information extension. For example, other entities related to "singer Faye Wang" can be recommended to the user through the entity relation when searching for "singer Faye Wang".

Embodiment 1

Figure 1:
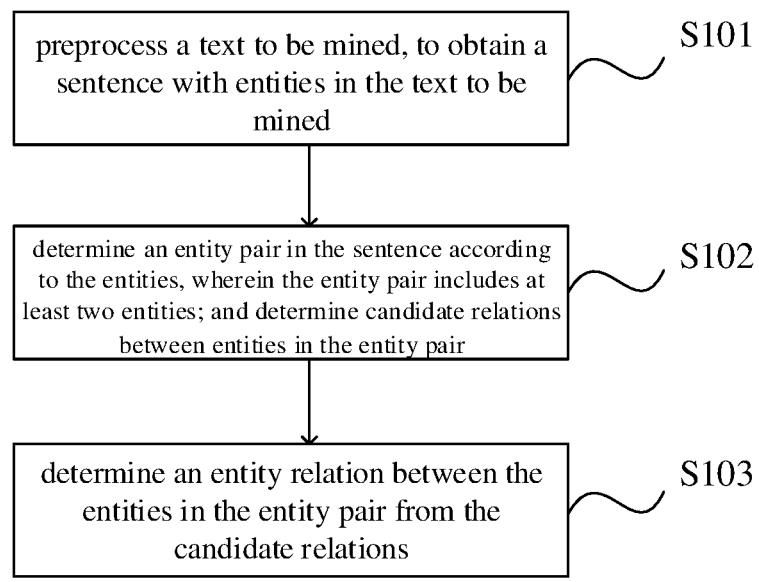
FIG. 1 is a flowchart of a method for extracting entity relation based on deep learning according to Embodiment 1 of the present disclosure.

According to an embodiment of the present disclosure, there is provided a method for extracting entity relation based on deep learning. As shown in FIG. 1, a method for extracting entity relation based on deep learning is provided according to the present embodiment of the disclosure, which includes the following steps S101-S103.

S101, a text to be mined is preprocessed, to obtain a sentence with entities in the text to be mined.

In this embodiment, the preprocessing step is very important. Specifically, preprocessing the text to be mined mainly includes: punctuating input text to be mined, so as to process a chapter-grained text to be mined into a sentence-grained text to be mined, and then filtering the punctuated sentence. Specifically, filtering the punctuated sentence includes: performing lexical analysis and syntactic analysis on the sentence to identify entities in the sentence, thereby completing basic text analysis on the sentence and extracting entity and relation information therein.

S102, an entity pair in the sentence is determined according to the entities, wherein the entity pair includes at least two entities; and candidate relations between entities in the entity pair are determined.

Firstly, all possible S-O pairs are determined in the sentence, then it is determined whether a relation exists in an S-O pair, and then possible P values for all S-O pairs with relations are extracted in the sentence, that is, candidate relations.

S103, an entity relation between the entities in the entity pair is determined from the candidate relations.

Specifically, a P value may be predicted to determine whether an SPO relation exists. Currently, S-O pair relation determination and P-value prediction both are realized in a deep learning model, and the deep learning model will be further introduced in the following Embodiment 2.

One of the above technical solutions has the following advantages or advantageous effects: preprocessing a text to be mined, obtaining a sentence containing entities and relations in the text to be mined; then extracting an entity pair and candidate relations therein; and further determining a candidate relation corresponding to the entity pair, whereby the relation is no longer limited in terms of category and field, and words of any part of speech that can represent the relation between the entities are used as a mining target, whereby relation between the entities may be described better, and entities are no longer limited within a certain field, but extend to full-scale entities and concepts, which can effectively improve connectivity of knowledge schemas.

Embodiment 2

Figure 2:
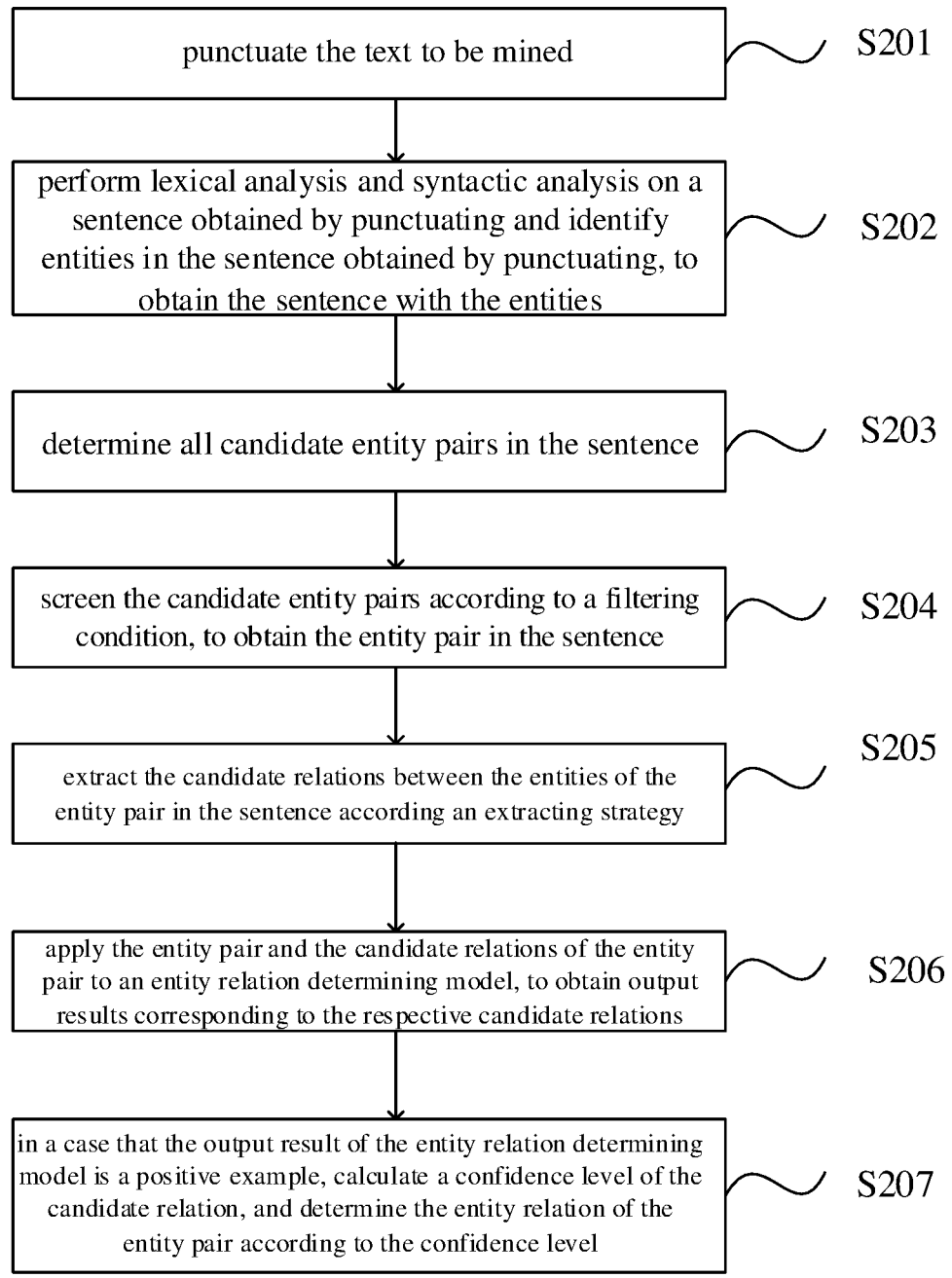
FIG. 2 is a flowchart of a method for extracting entity relation based on deep learning according to Embodiment 2 of the present disclosure.

According to an embodiment of the present disclosure, there is provided a method for extracting entity relation based on deep learning. As shown in FIG. 2, a method for extracting entity relation based on deep learning is provided according to the present embodiment of the disclosure, which includes the following steps S201-S207.

S201, a text to be mined is punctuated.

S202, lexical analysis and syntactic analysis is performed on a sentence obtained by punctuating, and entities in the sentence obtained by punctuating are identified, to obtain the sentence with the entities.

S203, all candidate entity pairs in the sentence are determined.

Specifically, S203 includes: A) identifying all entities contained in the sentence; and B) forming the candidate entity pairs by selecting any two entities of all entities.

That is to say, all entities identified from each sentence are arranged in pairs in order, forming all possible candidate entity pairs. The punctuating, the lexical analysis and syntactic analysis in the above steps may be implemented by analysis methods in conventional techniques, which will not be repeated herein.

S204, the candidate entity pairs are screened according to a filtering condition, to obtain the entity pair in the sentence.

Specifically, the filtering condition is determined according to at least one of:

a distance between the entities of the entity pair in a dependency tree;

the entities of the entity pair being core words of noun phrases in the sentence, and part of speech of the entities of the entity pair.

S205, the candidate relations between the entities of the entity pair in the sentence are extracted according an extracting strategy.

Specifically, the extracting strategy includes: extracting all nouns and verbs under the entity pair in a relation tree.

The step of determining the S-O pair candidates includes: pairing entities in each sentence in order to form all possible candidate pairs, and then screening an S-O pair that meets a filtering condition as the next candidate. The filtering condition may include a distance of S-O in the dependency tree, S and O being core words in noun phrases, the part of speech of S and O, and so on.

S206, the entity pair and the candidate relations of the entity pair are applied to an entity relation determining model, to obtain output results corresponding to the respective candidate relations.

Figure 3:
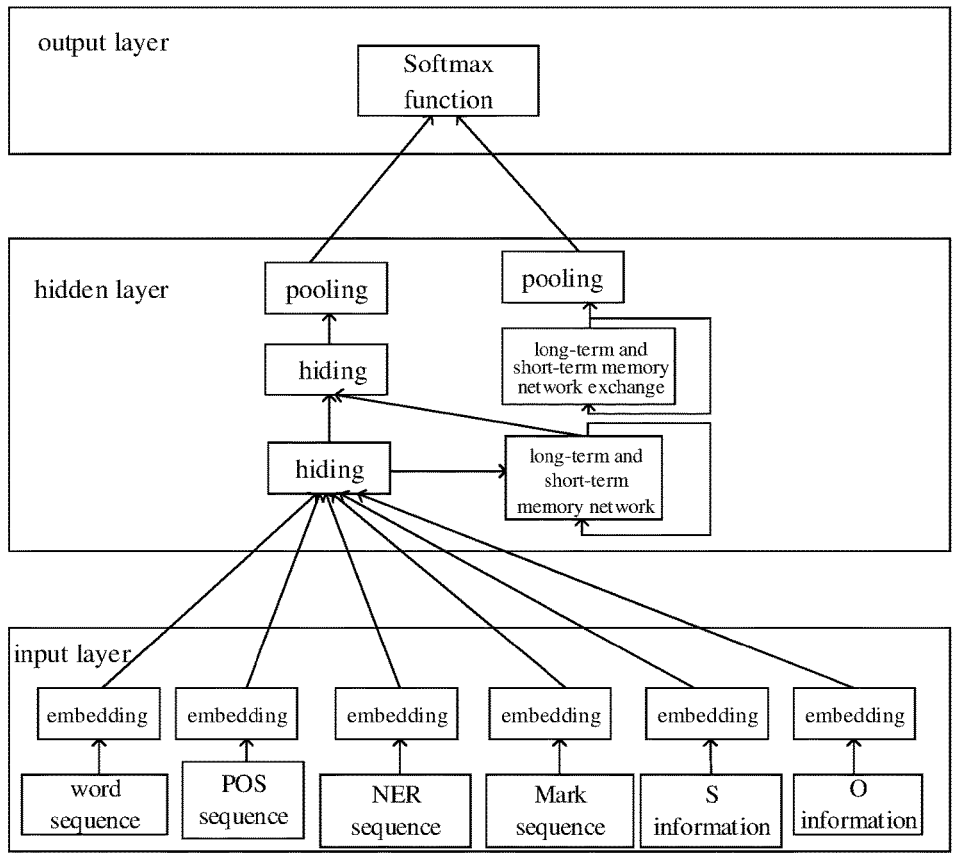
FIG. 3 is a structural diagram of an SPO mining system for the method for extracting entity relation based on deep learning according to Embodiment 2 of the present disclosure.

The relation of a current S-O pair is determined in a deep learning model. A structural diagram of an S-O pair relation determining layer network is shown in FIG. 3. An input layer includes a word sequence of a sentence, a part of speech (POS) tag sequence, a naming entity recognition (NER) sequence, a mark sequence and a position mark sequence (S info and O info, to mark whether the word is S or O). The input layer is connected to an upper network by embedding. The model part uses a deep learning network, and finally is connected to an output layer (Softmax layer) through pooling to complete classified output. In the specific implementation, S and O are input from the input layer, and then the relation P between the two is output by the output layer.

The step of extracting the candidate relation P may include: extracting from the sentence possible P values for all S-O pairs that are determined as positive examples by the S-O pair relation determining layer network. Current extraction strategy is to extract all nouns and verbs under the entity pair in the S-O subtree.

S207, in a case that the output result of the entity relation determining model is a positive example, a confidence level of the candidate relation is calculated, and the entity relation of the entity pair is determined according to the confidence level.

In the prediction of a candidate relation P, a S-O pair and its candidate relations P obtained by determining all the candidate relations P are classified in terms of the relation. One with the highest confidence level is selected from all the candidate relations P that are determined as positive examples, as the P value of the S-O pair. Currently, a classification model in a P-value prediction is another deep learning model, with a network structure diagram similar to the structure of the S-O pair relation determination layer network as shown in FIG. 3, except that information related to P is added in the input layer.

Figure 4:
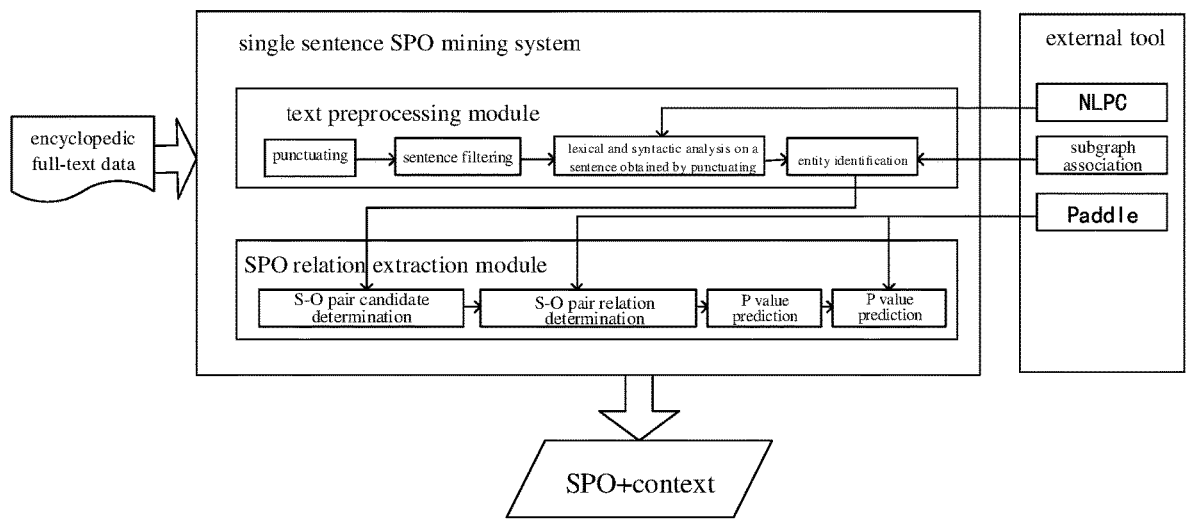
FIG. 4 is a structure diagram of an S-O pair relation determining layer network for the method for extracting entity relation based on deep learning according to Embodiment 2 of the present disclosure.

FIG. 4 is a structural diagram of an SPO mining system according to an embodiment of the present disclosure. When a user inputs encyclopedic full-text data, the encyclopedic full-text data are firstly preprocessed. A text preprocessing module is used for the preprocessing. The preprocessing step includes: punctuating, sentence filtering, lexical and syntactic analysis, and entity recognition. This step involves external tools, such as natural language processing technology (NLPC) and subgraph association. Then, the P value is predicted, wherein possible candidate relations are determined at the first time for performing the P value prediction, and one with the highest confidence level is determined from the possible candidate relations as the relation corresponding to the entities at the second time for performing the P value prediction. The determination of possible candidate relations are realized by S-O pair candidate determination and relation determination; the tool that may be used in this step is Paddle, and finally the SPO is output.

Another one of the above technical solutions has the following advantages or advantageous effects: using a deep learning model for unified modeling of all entity relations with no need for deep understanding of knowledge in the field or designing complex advanced features, making maintenance and expansion easy.

Besides, extraction from massive internet texts can obtain grand-scale entity relation data, which can not only satisfy the needs of search and recommendation of popular entities, but also can better solve the problem of covering long-tail entities.

Embodiment 3

Figure 5:
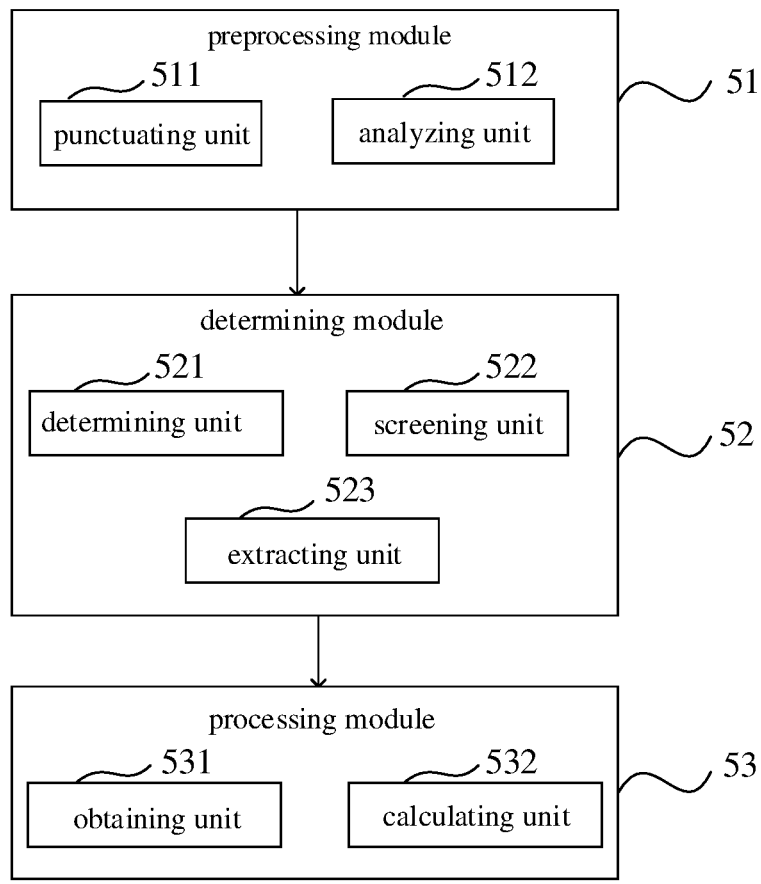
FIG. 5 is a structural diagram of a device for extracting entity relation based on deep learning according to Embodiment 3 of the present disclosure.

According to an embodiment of the present disclosure, there is provided a device for extracting entity relation based on deep learning. Shown in FIG. 5 is a device for extracting entity relation based on deep learning according to the present embodiment of the disclosure. The device for extracting entity relation based on deep learning according to the present embodiment of the disclosure includes the following modules:

a preprocessing module 51, configured for preprocessing a text to be mined, to obtain a sentence with entities in the text to be mined;

a determining module 52, configured for determining an entity pair in the sentence according to the entities, wherein the entity pair includes at least two entities, and determining candidate relations between entities in the entity pair; and a processing module 53, configured for determining an entity relation between the entities in the entity pair from the candidate relations.

Specifically, the preprocessing module 51 includes:

a punctuating unit 511, configured for punctuating the text to be mined; and an analyzing unit 512, configured for performing lexical analysis and syntactic analysis on a sentence obtained by punctuating and identifying entities in the sentence obtained by punctuating, to obtain the sentence with the entities.

Specifically, the determining module 52 includes:

a determining unit 521, configured for determining all candidate entity pairs in the sentence; and a screening unit 522, configured for screening the candidate entity pairs according to a filtering condition, to obtain the entity pair in the sentence.

Specifically, the determining module 52 further includes:

an extracting unit 523, configured for extracting the candidate relations between the entities of the entity pair in the sentence according an extracting strategy.

Specifically, the processing module 53 includes:

an obtaining unit 531, configured for applying the entity pair and the candidate relations of the entity pair to an entity relation determining model, to obtain output results corresponding to the respective candidate relations; and a calculating unit 532, configured for, in a case that the output result of the entity relation determining model is a positive example, calculating a confidence level of the candidate relation, and determining the entity relation of the entity pair according to the confidence level. This embodiment of the present disclosure can bring about the same advantageous effect of mining entities and their relations as that of the embodiment as shown in FIG. 1, which will not be repeated herein.

Embodiment 4

Figure 6:
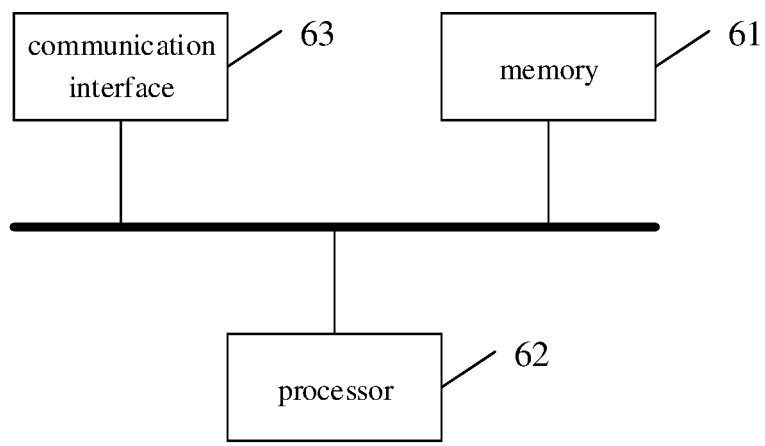
FIG. 6 is a structural diagram of a server according to Embodiment 4 of the present disclosure.

According to this embodiment of the present disclosure, there is provided an information classification device. As shown in FIG. 6, the information classification device includes a memory 61 and a processor 62. A computer program that can run on the processor 62 is stored in the memory 61. When the processor 62 executes the computer program, the information classification method in the above embodiment is implemented. The number of each of the memory 61 and the processor 62 may be one or more.

The device also includes:

a communication interface 63, configured for allowing the memory 61 and the processor 62 to communicate with an external device.

The memory 61 may include a high-speed RAM memory, or may also include a non-volatile memory, such as at least one disk memory.

If the memory 61, the processor 62 and the communication interface 63 are implemented independently, the memory 61, the processor 62 and the communication interface 63 may be connected to each other via a bus so as to realize mutual communication. The bus may be an industry standard architecture (ISA) bus, a peripheral component interconnect (PCI) bus, an extended industry standard architecture (EISA) bus, or the like. The bus may be categorized into an address bus, a data bus, a control bus or the like. For ease of illustration, only one bold line is shown in FIG. 6 to represent the bus, but it does not mean that there is only one bus or only one type of bus.

Optionally, in a specific embodiment, if the memory 61, the processor 62 and the communication interface 63 are integrated on one chip, then the memory 61, the processor 62 and the communication interface 63 can complete mutual communication through an internal interface.

Embodiment 5

According to this embodiment of the present disclosure, there is further provided a computer-readable storage medium which stores a computer program. The program, when executed by a processor, implements the method as described in any of the embodiments of FIGS. 1 to 4.

In the present specification, the description referring to the terms "an embodiment", "some embodiments", "an example", "a specific example", or "some examples" or the like means that the specific features, structures, materials, or characteristics described in connection with the embodiment or example are contained in at least one embodiment or example of the disclosure. Moreover, the specific features, structures, materials, or characteristics described may be combined in a suitable manner in any one or more embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of the present disclosure, the meaning of "a plurality" is two or more than two, unless otherwise explicitly or specifically indicated.

Any process or method described in the flowcharts or otherwise described herein may be construed as a module, segment or portion of code representing executable instructions including one or more steps for implementing a particular logical function or process. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

The logics and/or steps represented in the flowchart or otherwise described herein for example may be considered as an ordered list of executable instructions for implementing logical functions. They can be specifically embodied in any computer-readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the purposes of the present specification, "computer-readable medium" can be any means that can contain, store, communicate, propagate or transmit programs for use by an instruction execution system, apparatus or device or for use in conjunction with the instruction execution system, apparatus or device.

The computer-readable medium described in the embodiments of the disclosure may a computer-readable signal medium or a computer-readable storage medium or any combination of a computer-readable signal medium and a computer-readable storage medium. More specific examples (non-exhaustive list) of a computer-readable storage medium at least include: an electrical connection (an electronic device) having one or more wires, a portable computer disk cartridge (a magnetic device), a random access memory (RAM), a read only memory (ROM), an erasable programmable read-only memory (EPROM or a flash memory), a fiber optic device, and a portable read only memory (CDROM). In addition, the computer-readable storage medium may even be a paper or other suitable medium on which the program can be printed. This is because for example the paper or other medium can be optically scanned, followed by editing, interpretation or, if necessary, other suitable ways of processing so as to obtain the program electronically, which are then stored in a computer memory.

In an embodiment of the disclosure, the computer-readable signal medium may include a data signal propagating in a baseband or as a part of a carrier, in which computer-readable program codes are carried. Such propagating data signal can take a variety of forms including, but not limited to, electromagnetic signal, optical signal, or any suitable combination of the electromagnetic signal and optical signal. The computer-readable signal medium may also be any computer-readable medium other than a computer-readable storage medium, and the computer-readable medium can send, propagate or transmit a program for use by an instruction execution system, an input method or a device, or for use in conjunction with an instruction execution system, an input method or a device. The program codes embodied in the computer-readable medium can be transmitted by any suitable medium, including but not limited to: wireless, wire, optic cable, radio frequency (RF), etc., or any suitable combination of the foregoing.

It should be understood that individual portions of the present disclosure may be implemented in the form of hardware, software, firmware, or a combination thereof. In the above embodiments, a plurality of steps or methods may be implemented using software or firmware stored in a memory and executed by a suitable instruction execution system. For example, if they are implemented in hardware, as in another embodiment, any one or a combination of the following techniques known in the art may be used: a discrete logic circuit having a logic gate circuit for implementing a logic function on data signal, an application-specific integrated circuit having a suitable combined logic gate circuit, a programmable gate array (PGA), a field programmable gate array (FPGA), etc.

Those skilled in the art may understand that all or some of the steps carried in a method of the foregoing embodiments may be implemented by using a program to instruct the relevant hardware, and the program may be stored in a computer-readable storage medium. When executed, the program includes one or a combination of the steps in the method embodiment.

In addition, individual functional units in each embodiment of the present disclosure may be integrated in one processing module, or individual units may also exist physically and independently, or two or more units may also be integrated in one module. The above integrated module can be implemented in the form of hardware or in the form of a software functional module. The integrated module may also be stored in a computer-readable storage medium if it is implemented in the form of a software functional module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be subject to the scope of protection of the appended claims.

What is claimed is:

1. A method for extracting entity relation based on deep learning, the method comprising:
   preprocessing a text to be mined, to obtain a sentence with entities in the text to be mined;
   determining an entity pair in the sentence with the entities, wherein the entity pair comprises at least two entities, and determining candidate relations between the entities in the entity pair; and
   determining an entity relation between the entities in the entity pair from the candidate relations,
   wherein the determining an entity relation between the entities in the entity pair from the candidate relations comprises:
      calculating confidence levels of the candidate relations, and determining the entity relation from the candidate relations according to the confidence levels of the candidate relations.

2. The method of claim 1, wherein preprocessing a text to be mined comprises:
   punctuating the text to be mined; and
   performing lexical analysis and syntactic analysis on a punctuated sentence obtained by punctuating, and identifying entities in the punctuated sentence, to obtain the sentence with the entities.

3. The method of claim 1, wherein determining an entity pair in the sentence comprises:
   determining all candidate entity pairs in the sentence; and
   screening the candidate entity pairs according to a filtering condition, to obtain the entity pair in the sentence.

4. The method of claim 3, wherein determining all candidate entity pairs in the sentence comprises:
   identifying all entities in the sentence; and
   forming the candidate entity pairs by selecting any two entities of all entities identified.

5. The method of claim 3, wherein the filtering condition is determined according to at least one of:
   a distance between the entities of the entity pair in a dependency tree,
   the entities of the entity pair being core words of noun phrases in the sentence, and
   parts of speech of the entities of the entity pair.

6. The method of claim 1, wherein determining candidate relations between entities in the entity pair comprises:
   extracting the candidate relations between the entities of the entity pair in the sentence according an extracting strategy.

7. The method of claim 6, wherein the extracting strategy comprises:
   extracting all nouns and verbs under the entity pair in a relation tree.

8. The method of claim 1, wherein determining an entity relation between the entities in the entity pair from the candidate relations comprises:
   applying the entity pair and the candidate relations of the entity pair to an entity relation determining model, to obtain output results corresponding to the respective candidate relations; and
   in response to the output result of the entity relation determining model being a positive example, calculating the confidence level of the candidate relation, and determining the entity relation of the entity pair according to the confidence level.

9. A device for extracting entity relation based on deep learning, the device comprising:
   a preprocessing module, configured for preprocessing a text to be mined, to obtain a sentence with entities in the text to be mined;
   a determining module, configured for determining an entity pair in the sentence according to the entities, wherein the entity pair comprises at least two entities, and determining candidate relations between the entities in the entity pair; and
   a processing module, configured for determining an entity relation between the entities in the entity pair from the candidate relations,
   wherein the processing module is further configured for calculating confidence levels of the candidate relations from the candidate relations, and determining the entity relation according to the confidence levels of the candidate relations.

10. The device of claim 9, wherein the preprocessing module comprises:
    a punctuating unit, configured for punctuating the text to be mined; and
    an analyzing unit configured for performing lexical analysis and syntactic analysis on a punctuated sentence obtained by punctuating, and identifying entities in the punctuated sentence, to obtain the sentence with the entities.

11. The device of claim 9, wherein the determining module comprises:
    a determining unit, configured for determining all candidate entity pairs in the sentence; and
    a screening unit, configured for screening the candidate entity pairs according to a filtering condition, to obtain the entity pair in the sentence.

12. The device of claim 9, wherein the determining module further comprises:
    an extracting unit, configured for extracting the candidate relations between the entities of the entity pair in the sentence according an extracting strategy.

13. The device of claim 9, wherein the processing module comprises:
    an obtaining unit, configured for applying the entity pair and the candidate relations of the entity pair to an entity relation determining model, to obtain output results corresponding to the respective candidate relations; and
    a calculating unit, configured for, in response to the output result of the entity relation determining model being a positive example, calculating the confidence level of the candidate relation, and determining the entity relation of the entity pair according to the confidence level.

14. A server, comprising:
    one or more processors; and
    a storage device for storing one or more programs;
    wherein the one or more processors execute the one or more programs to implement the method of claim 1.

15. A non-volatile computer-readable storage medium, in which a computer program is stored, wherein the program, when executed by a processor, implements the method of claim 1.

* * * * *